Sept. 6, 1966　　　　J. SCHWAIGER　　　　3,271,499
METHOD AND APPARATUS FOR MAKING ELONGATED FLEXIBLE BANDS OF
ANY DESIRED LENGTH IN A STEP-WISE MANNER
Filed Jan. 21, 1965　　　　　　　　　　　　　　3 Sheets-Sheet 1
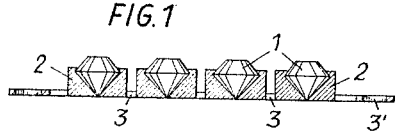
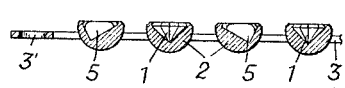
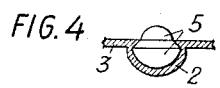
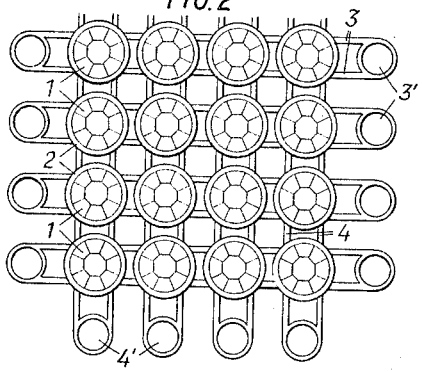
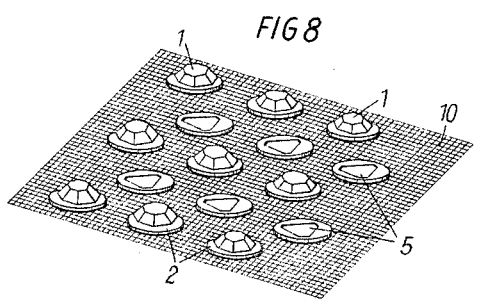
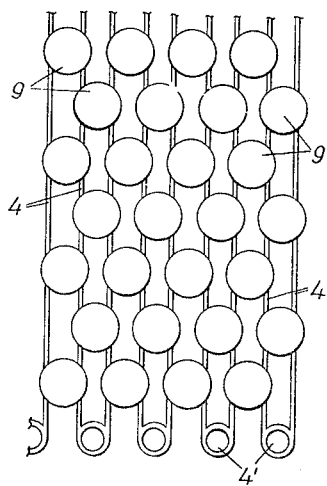
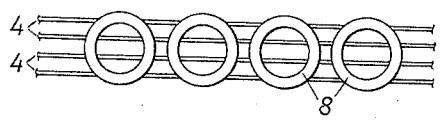
INVENTOR.
Johann Schwaiger
BY
Nolte and Nolte Sept. 6, 1966  J. SCHWAIGER  3,271,499
METHOD AND APPARATUS FOR MAKING ELONGATED FLEXIBLE BANDS OF
ANY DESIRED LENGTH IN A STEP-WISE MANNER
Filed Jan. 21, 1965  3 Sheets-Sheet 2
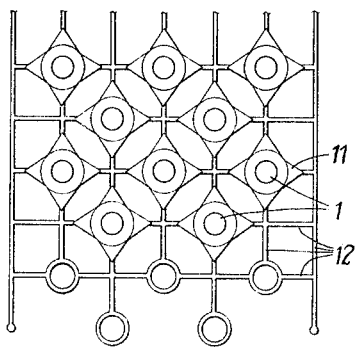
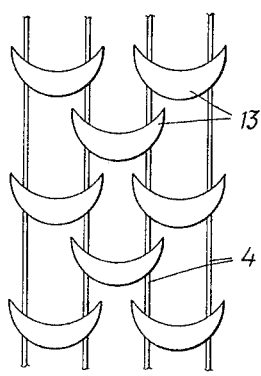
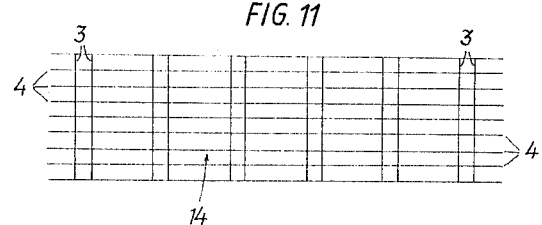
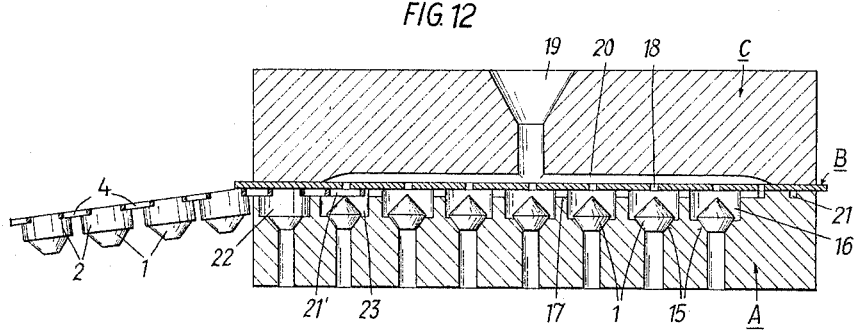
INVENTOR.
Johann Schwaiger
BY
Nolte and Nolte Sept. 6, 1966 J. SCHWAIGER 3,271,499
METHOD AND APPARATUS FOR MAKING ELONGATED FLEXIBLE BANDS OF
ANY DESIRED LENGTH IN A STEP-WISE MANNER
Filed Jan. 21, 1965 3 Sheets-Sheet 3
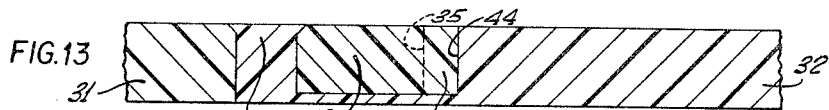
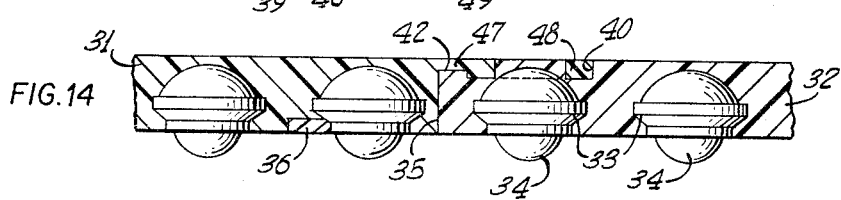
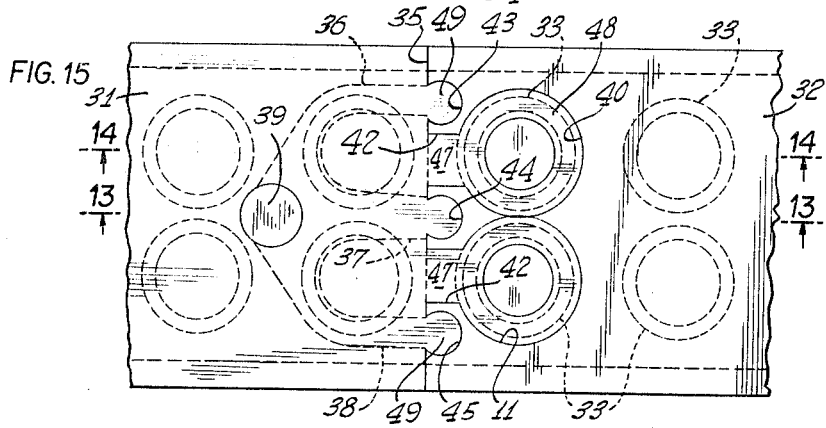
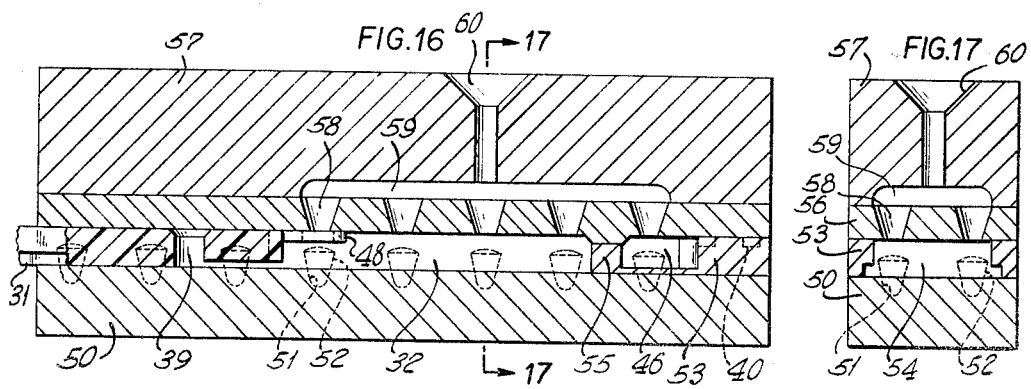
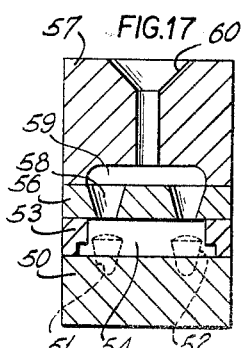
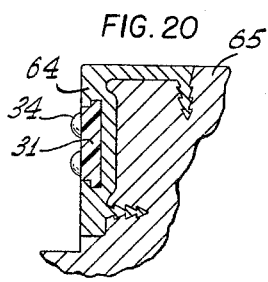
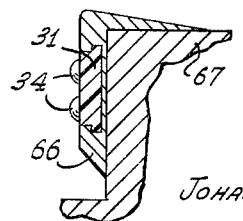
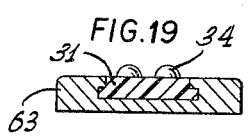
INVENTOR
JOHANN SCHWAIGER
BY
Nolte & Nolte
ATTORNEYS United States Patent Office 3,271,499
Patented Sept. 6, 1966

3,271,499
METHOD AND APPARATUS FOR MAKING ELONGATED FLEXIBLE BANDS OF ANY DESIRED LENGTH IN A STEP-WISE MANNER
Johann Schwaiger, Wattens, Tyrol, Austria, assignor to D. Swarovski & Co., Wattens, Tyrol, Austria
Filed Jan. 21, 1965, Ser. No. 426,767
Claims priority, application Austria, Aug. 18, 1964, 7,129/64
2 Claims. (Cl. 264—261)

The present application is a continuation-in-part of co-pending application Serial No. 100,993, filed April 5, 1961, and entitled Strip Comprising a Flexible Carrier and Ornamental Elements of Glass, Plastic or the Like, or Reflecting Elements, Spaced on Said Carrier, and Process of and Mold for Manufacturing Such Strip, and now abandoned.

Ornamental strips having ornamental stones in settings or ornamental elements on carriers have previously been manufactured in the case of filament braids by setting the ornamental stones in metal sockets by the application of the prongs thereof or, by the shaping of plastic compositions, the fixing means consisting of various substances embedded together with the ornamental stones. In some cases, ornamental elements were embedded along in the carriers (filaments, woven fabrics, strips, etc.) during the shaping of the ornamental elements (U.S. Patents Nos. 1,997,500 and 2,163,814; and Austrian Patents Nos. 160,-717; 160,785; 170,713; and 163,414).

It is known that the manufacture or ornamental strips of the first kind is time-consuming, even when manufacturing aids are used, in that they have a relatively heavy weight, a less pleasing appearance and a restricted field of application. On the other hand, ornamental strips comprising ornamental stones or ornamental elements set in plastics in carriers have great effects owing to their effect and diversity in form. They are light in weight and have a wide field of application owing to their desirable properties.

Rear reflectors, as are prescribed e.g., for vehicles, have also been made in many cases by embedding individual reflecting elements in a plastic plate or in openings of a sheet metal strip or the like, also with the aid of plastic. This manufacture is also complicated and the product does not always meet all requirements.

It is an object of the invention to provide new effects and advantages by replacing the previously used connecting means such as filaments, woven fabrics, bands, sheet metal strips and the like by plastic structures obtained in a special manner. According to the invention a strip which comprises a flexible carrier and ornamental elements of glass, plastic or the like, or reflecting elements, spaced on said carrier is characterized in that the carrier, which may consist of a net or imitate a braid or woven fabric and any ornament, meanders, figurative elements with which it is provided and which form or contain the ornamental or reflecting elements, is integrally formed from a plastic composition which can be cast injection- or compression-molded.

Another feature of an ornamental strip produced according to the invention resides in that the edge of the carrier is provided with sporadically or regularly spaced projections such as eyelets, loops and the like.

As will be set forth more fully hereinafter, the invention provides processes of manufacturing such ornamental strips and a mold suitable for this purpose.

The effects and advantages of the invention may be summed up as follows:

Greater latitude is provided in the arrangement of the ornamental elements relative to the arrangement or of the carrier filaments or the spacings thereof if there is any contact with the settings for the stones. Nevertheless the ornamental element is fused with the filaments and reliably held whereas with only partly embedded filaments, according to the previous practice, the ornamental element tends to break out under the least stress or ceases to have any connection when touched.

Manifold arrangements of the carrier filaments, parallel, criss-cross, oblique, closely or widely spaced, in straight or curved or figurative lines etc., e.g., in the form of a cobweb, at the nodes of which ornamental stones are embedded. Such manufacture has not been possible before. It is also possible to provide lines in the form of names, initials, styles of firms in conjunction with ornamental elements or ornamental stones held in settings, reflectors, metal laminae and the like.

Independence of the arrangement of ornamental elements, settings of ornamental stones, reflectors etc. on strips consisting, e.g., of sheeting, because these are jointly made in one shaping operation and form an integral unit. It was previously necessary to form the plastic sheeting or metal strip with openings interengaging with the stone setting to retain the same.

Independence regarding the cross-section of the connecting means themselves. This cross-section may be chosen for a maximum rigidity or maximum elasticity of the strip. It is also possible to provide a strip which has a higher flexibility in the longitudinal direction and a higher rigidity in the transverse direction.

The elasticity of the connecting means enables strip assemblies to be stretched over curved surfaces, such as the uppers of shoes.

The stability of the connecting means according to the invention widens the field of application because there is no need for special supports during the processing of strip parts to form trim etc. in conjunction with reflectors, ornamental stones or ornamental elements. Another example are cuffs for arms or legs with embedded reflectors and locks. These may also be made from the same plastic composition in one operation.

The application of loops or eyelets enables the connection of strips in the same or different colors in the directions of the length and width: formation of a wide range of patterns.

The possibility of reinforcing the ends of the filaments, fabrics, sheets simultaneously during the shaping operation and to connect them, if desired, with beads to facilitate the fixation to bag frame members and the like or to provide the edge with a fine finish or border.

The possibility of providing fabrics with most accurately spaced filaments enables also the manufacture of rasters for the setting of ornamental stones in metal sockets by machines, or the manufacture of screen inserts.

Enhancement of the style effects by providing additional color nuances, diversity of forms in the selection and shaping of the connecting means.

Lower mold costs compared to the previous embedding of threads of woven fabrics in settings. The thread bobbins, the tensioning carriages, the thread snubbing means etc. are eliminated.

Lower manufacturing costs compared to the previous design by the elimination of the introduction of the connecting means into the mold. Plastic composition is saved because the connecting means consisting of the same material as the settings for the ornamental stones need not be embedded but may lie, as it were, on the surface.

The present invention deals particularly with a process and mold for manufacturing flexible bands of any desired length in a stepwise manner, these bands being made, for example, of thermoplastic materials. In particular the bands of the invention are adapted to carry bodies such as jewelry or light-reflecting elements, these bodies being embedded in the flexible plastic band of the invention. Also, the invention deals with a mold and a process which makes it possible to mold one section of a band onto a previously molded section thereof so that in this stepwise manner a band of any desired length can be formed. Of course, any article such as light-reflecting bodies of the above type can be embedded in the band simultaneously with the molding thereof.

Bands of this type can be used for ornamental purposes on clothing or on the inside or outside of buildings. Also, they can be used for safety purposes on vehicles and in roads, where the light reflecting from the reflecting elements carried by the bands will make the roads and the vehicles easily visible, particularly at night. Bands of this type in general are supplied in lengths ranging from 20 to 50 meters. It is possible for such bands to be directly molded at the places where they are eventually to be mounted, or they can very easily be joined to their ultimate mountings. It is also possible, however, to provide for bands of this type metal or plastic mounting structures which can receive and support the bands.

A particular object of the present invention in connection with bands of this latter type is to provide a process and mold which make it possible to connect, in a very reliable manner, one band section to the next band section so that there is no possibility of separation between the band sections after the band is manufactured.

According to the invention the plastic material is introduced into a mold which has at one end a cavity whose configuration is the negative of anchoring elements which are to be molded on one end of the plastic body formed in the mold, and before the plastic material is introduced into the mold a previously molded section is situated at the other end of the mold closing the cavity thereof and having the previously molded anchoring elements about which the plastic material flows so as to securely and reliably unite one molded plastic section to the previously molded plastic section, with a bond which is for all practical purposes the same as a single unitary band molded in one piece.

The anchoring portions of each molded band section can have the configuration of eyes, pins, or the like, and these anchoring portions are preferably uniformly distributed across each band section according to a predetermined pattern.

The invention is illustrated by way of example in the accompanying drawings which form part of the application and in which:

FIG. 1 is a transverse sectional view showing an ornamental strip;

FIG. 2 is a top plan view thereof;

FIGS. 3–5 are respectively sectional views;

FIGS. 6 and 7 are respectively elevations;

FIG. 8 is an elevation in perspective;

FIGS. 9–11 are further elevations;

FIG. 12 is a sectional view showing one possible construction of a mold of the invention;

FIG. 13 is a longitudinal sectional view taken along line 13—13 of FIG. 15 and showing the manner in which a pair of band sections are joined to each other;

FIG. 14 is a longitudinal sectional elevation taken along line 14—14 of FIG. 15 and showing another part of the structure for joining a pair of band sections to each other;

FIG. 15 is a top plan view of the structure of FIGS. 13 and 14, the different directions of the hatching of FIGS. 13 and 14 and the lines indicating the adjoining surfaces of the different band sections in FIGS. 13–15 being provided only to illustrate the manner in which the band sections are formed in order to be united together, whereas actually the band sections flow into and fuse together so as to form a unitary structure which will not have the lines of demarcation between its sections which are visible in FIGS. 13–15;

FIG. 16 is a longitudinal sectional elevation of another embodiment of a mold according to the invention;

FIG. 17 is a transverse section of the mold of FIG. 16 taken along line 17—17 of FIG. 16;

FIG. 18 is a transverse section of one embodiment of a band mounting structure;

FIG. 19 is a transverse section of another embodiment of a band mounting structure;

FIG. 20 illustrates yet another embodiment of a mounting structure of the invention shown mounted in position; and FIG. 21 shows yet another embodiment of a mounting structure of the invention for carrying a band of the invention and shown in FIG. 21 mounted in position.

In the sectional view of FIG. 1, the ornamental stones 1 are embedded in the settings 2, which are shaped at the same time as the transverse filaments 3 or the longitudinal filaments 4 (apparent from the plan view shown in FIG. 2) of the carrier. The longitudinal filaments extend at right angles to the transverse filaments. FIG. 2 shows the settings 2, arranged in rows, for the ornamental stones and the ornamental stones 1 embedded therein and the transverse filaments 3 and longitudinal filaments 4 are shaped at the same time. The ends of these filaments may be connected, e.g., in pairs, to form eyelets 3' and 4', which may be sewed to a backing, or are required to extend the strip in the direction of its length or width during the shaping operation.

In the transverse sectional view of the strip shown in FIG. 3 the ornamental stones 1 embedding in the settings 2 are apparent beside the reflecting elements, 5 which may be, e.g., embedded alternatingly with the roses. The embedding is effected simultaneously with the shaping of the connecting means 3. Pairs of these connecting means form again eyelets 3' spaced like the stones. The connecting means consisting of filaments or woven fabrics, sheeting etc. are slightly spaced from the bottom level of the ornamental strip in the present case, as contrasted with FIG. 1. In FIG. 4 another reflecting element 5 having spherical surfaces is embedded, e.g., in the setting 2, which has been made with the connecting means 3 (consisting in the present case of a sheet) from the same plastic material and in one operation.

In the sectional view of the ornamental strip shown in FIG. 5 the ornamental element 6 which is made in one operation with the carrier 3 consists of a bead half having a rear cavity 7.

FIG. 6 is an elevation showing an ornamental strip set with a single row of ornamental elements consisting of rings 8. This strip has been made in a single operation with the parallel longitudinal filaments 4 made from a plastic composition.

FIG. 7 is an elevation showing an ornamental strip, the ornamental elements of which consists of small solid discs or half-beads 9 in a staggered arrangement and connected by carriers consisting of parallel filaments 4. If the color of the carriers differs from that of the ornamental elements, the latter are made in a separate, earlier step and subsequently are embedded simultaneously with the shaping of the carriers, as in the case of the embedding of ornamental stones. This embedding of the ornamental elements may cause the plastic compositions to partially fuse together.

In the perspective elevation of FIG. 8 the carrier is a woven fabric which has also been formed in one operation with the embedding of the ornamental stones 1 and of the reflecting elements 5 in their settings 2 of plastic composition.

FIGS. 9 and 10 are elevations showing ornamental strips. According to FIG. 9 the star-shaped ornamental elements 11 with embedded ornamental stones 1 and the net 12 as a carrier have been shaped in one operation. According to FIG. 10 the ornamental elements 13 are crescent-shaped and are integrally formed with the longitudinal filaments from a plastic composition.

According to FIG. 11 a net 14 is made only from a plastic composition and may serve as an ornamental strip alone. It is made with simple lines, with longitudinal and transverse filaments as shown, or in meanders, curved lines or figurative showings of various kinds.

FIG. 12 shows, by way of example, a mold according to the invention for the manufacture of ornamental strips by casting or injection molding. The mold consists of a mold base A, in which the ornamental stones 1 are located in negatives 15 formed in the cavities 16 for the settings and in which projections 17 are formed for the connecting means. The mold comprises further a thin middle part B formed with drilled holes 18 for the supply of the composition, and a cover C for distributing the composition. This cover is formed with a gate 19 and distributing channels 20. All three parts of the mold are extended in width, to the left in the case shown, to enable an extension of the shaped strip section. The base has a series of additional negatives, into which the row of settings 22 shaped last is impressed. The filament eyelets 21' extend into the mold negatives of the first row of settings 23 to be shaped. After the mold has been assembled with its parts located relative to each other by fitting pins, the composition is injected in the usual manner and during the shaping operation the filament end 21' of the previously made strip is firmly bonded and partly fused to the new section. On the right side the mold part is shown which serves for forming the filament eyelets 21 for the next extension of the strip. The process described enables the manufacture of all kinds and forms or ornamental strips in a single operation, in which strips the settings for the embedded ornamental stones, reflecting elements and ornamental elements, or these elements themselves, as well as their connecting means such as filaments, filament braids, networks, strip elements, webs, sheets etc. consist of plastic compositions.

Plastic compositions which are particularly suitable for carrying out the present invention include the polyamides, polyvinylchloride compounds and polyurethanes. They are elastic, extensible, highly workable, have a high strength and extremely high chemical resistance.

FIGS. 13–15 illustrate the region where a pair of band sections, manufactured according to the process of the invention in the mold of the invention, are joined together. The band sections 31 and 32 have the reflecting elements 33 embedded therein, and these reflecting elements are arranged in a pair of longitudinal rows extending along the length of the band with the reflecting elements 33 of one row aligned with the reflecting elements 33 of the other row. The reflecting elements 33 are embedded in a conventional manner in the band sections which are composed of synthetic resins. Only the convexly curved end portions 34 of the elements 33 project beyond the bands so as to be visible.

Each band section is provided at one end with anchoring portions which mate with the configuration of the next band section to interlock therewith. In this way the band sections become mechanically interconnected. The mechanical interconnection together with the fusing of the plastic material of the successive band sections to each other forms an extremely secure union between the successive band sections.

Referring to FIGS. 13–15, at its end 35 the band section 32 is provided at its lower portion with three longitudinally extending arms 36, 37, 38 which are united together at their outer ends where, at the central longitudinal axis of the band section, they are formed integrally with a pin portion 39 which extends from the lower band portions 36–38 upwardly through the thickness of the band, the upper surface of the pin portion 39 of the band 32 being at the same elevation as the rest of the upper surface of the band section 32, as viewed in FIG. 13. In addition, the upper surface of the band section 32 is formed, just to the right of its end face 35 with a pair of circular grooves 40 and 41 which are respectively united with the end face 35 through the longitudinally extending grooves 42 which extend between the end face 35 and the circular grooves 40 and 41 formed in the top face of the band section 32, as is particularly apparent from FIGS. 14 and 15. In addition the end face 35 of the band section 32 is formed with vertically extending grooves 43, 44, 45, which are uniformly distributed across the width of the band section 32 and which extend from the top face of the band section 32 down to the elevation of the top surface of the three arms 36–38. In cross section each of these vertically extending grooves 43–45 forms part of a circle, as is particularly apparent from FIG. 15. The term "vertical" refers only to the fact that the grooves extend through the thickness of the band substantially perpendicularly to the upper and lower faces thereof.

If the above-described anchoring portions at the end of band section 32 are considered to be of a negative configuration then the band section 31 has a mating positive configuration. Thus, the pin portion 39 of the band section 32 is surrounded by the portion 46 of the band section 31, this portion 46 being formed with an opening which is filled by the pin portion 39 in the manner shown most clearly in FIG. 13. In addition, the portion 46 of the band section 31 has eyes formed by rings 48 which are connected by extensions 47 to the portion 46 of band section 31, and these rings 48 are respectively received in and fill the grooves 40 and 41 while the connecting portions 47 respectively fill the channels 42 extending between the end face 35 and the grooves 40 and 41 of the band section 32. The upper surface of the portion 46, together with its extensions 47 and eyes 48, is flush with the upper surface of the band section 32 as well as with the remainder of the upper surface of the band section 31, so that a smooth unitary structure having an uninterrupted top face is provided in this way. In addition the band section 31 is provided at its end face with vertically extending projections 49 which are received in and fill the vertical grooves 43–45 with the top faces of the projections 49 also being flush with the top surface of the band section 32. The bottom surface of the section 46 of band section 31 is formed with grooves which receive the arms 36–38, so that between these grooves the portion 46 of band section 31 is flush with the bottom surface of band section 32 as well as with the remainder of the bottom surface of band section 31. In this way the bottom surface of the united band sections also is continuous.

The above-described construction is analogous to the manner in which a person can interlace the fingers of his hands with the fingers of one hand projecting through the spaces between the fingers of the other hand, so that with the structure of the invention an intimate, secure connection is provided. The security of the connection is enhanced by the fact that actually the interfaces between the band sections flow into each other and are fused together during the manufacture of the band sections in a mold as described below. During the actual molding of the band of the invention, each section 32 will be poured at its end portion described above around the anchoring portions at the end of the previously molded section 31, so that the negative of the band section 32 corresponds perfectly with the positive of the band section 31 by being molded directly onto the latter, filling in all cavities thereof and conforming to all of the variations in the configuration thereof. Therefore, not only do the mating configurations correspond exactly to each other, but in addition they are fused or welded together so as to produce a joint which is without any interruption and is for all practical purposes the same as an integral, unitary structure.

The mold for manufacturing the structure of FIGS. 13–15 is illustrated in FIGS. 16 and 17. This mold includes a lower portion 50 formed at its top face with recesses 51 for receiving the projecting portions 34 of the bodies 33 referred to above, these bodies being indicated in FIGS. 16 and 17 by the bodies 52 which have their portions of larger cross section extending into the mold cavity where the section 32 is formed so as to become embedded in the mold section 32. The distribution of the recesses 51 will of course correspond to whatever desired pattern of reflecting elements or the like are to be carried by the band of the invention.

At one end of the mold cavity is situated a mold part 53 having the configuration of the left end of the band section 32 described above. Thus, this mold part 53 has a cavity in which the band end portion 46 is formed and in addition it has a projection 55 which will form the cavity for receiving the pin 39 of the section 32 described above. In other words, the right hand part of the mold shown in FIG. 16 carries the part 53 which has the negative configuration of the left end of the band section 32 described above in connection with FIGS. 13–15, and thus this negative mold configuration 53 will enable the mold to form at its right end, as viewed in FIG. 16, the positive configuration of the right end portion of the band section 31 referred to above.

The mold includes a plate 56 which rests directly on the mold section 53, and a top mold member 57 is situated over and engages the plate 56. This plate 56 is formed with the openings 58 which communicate with the canal 59 which in turn communicated with the inlet 60 for the plastic molding material which may be any suitable thermoplastic material. Thus, this thermoplastic material when poured through the opening 60 will flow along the passage 59 and down through the several openings 58 into the mold cavity in order to form the band section 32. It will be noted from FIGS. 16 and 17 that with this arrangement an opening 58 is situated in line with each body 52 so that each body 52 is individually engaged with the molten plastic material to be securely and reliably surrounded thereby.

The left end of the mold cavity shown in FIG. 16 is open. This open left mold end is closed by the right end of the previously molded band section 31, this right band end of course having the above-described configuration shown in FIGS. 13–15. This right band end had just previously been molded at the right end portion 53 of the mold of FIG. 16.

In using the mold of the invention, according to the process of the invention, the upper parts 56 and 57 are initially removed from the bottom part of the mold, and the bodies 52 are placed in the various recesses 51. Then the previously molded section 31 is placed at the left end of the mold cavity, as viewed in FIG. 16, and it will be noted that in the illustrated example the pair of end bodies, of each row, which are already embedded in the section 31 are placed in the recesses of the bottom mold body 50 so that in this way the previously molded section 31 is securely anchored to the mold in a proper position for being united with the next section 32 in a manner which will form uninterrupted rows of bodies embedded in the elongated plastic band with all of the bodies uniformly spaced from each other longitudinally of the band in each row.

Thus, the section 31 securely closes the mold cavity at its open left end. Then the parts 56 and 57 are replaced in the position shown in FIGS. 16 and 17, and the material is poured into the mold in the manner described above. FIG. 17 in particular shows how the openings 58 are arranged in both rows over each of the bodies which are to be embedded.

The band section 32 is formed in this way, and it will be noted that the material will not only flow around the mold portion 53 to form a positive end of the band section but in addition it will fill all of the gaps and flow all around the projections of the previously molded end formed by the mold section 53, so that the pin portion 39 will be formed in a manner indicated in FIG. 16, for example, as well as the three arms 36–38 and the portions of the band section 32 which surround all except the top surfaces of the eyes 48 and the extensions 47 which connect the eyes to the section 46 which was molded by the portion 53 during the previous cycle of operations.

In this way the positive and negative band sections becomes securely united and fused together and the reflecting bodies are embedded therein.

After each section 32 is molded, the mold is opened and the above operations are again repeated, after the molded section 32 has set sufficiently, so that the newly molded section 32 now occupy the position shown for the previously molded section 31 in FIG. 16, and in this way the cycles of operations are repeated one after the other to form a band of any desired length.

As is apparent from the above description, the anchoring portions of the band sections can take any desired variety of forms. However, it is preferred to provide anchoring portions which are uniformly distributed according to a predetermined pattern across the width of the band sections. Thus, the union between the successive band sections will be uniform. Moreover it is clear that the invention can be practiced without articles embedded in the band.

As is apparent from FIGS. 17–19, the mold cavity formed by element 53, which extends not only across the right end of the mold of FIG. 16 but also along the entire length of the mold at its front and rear, provides the band with stepped longitudinal edges having lips which are adapted to be received in corresponding grooves at the inner side surfaces of elongated channel members such as the member 62 and 63 of FIGS. 18 and 19 which may be made of metal so as to be mounted at any suitable location. In this way the band 31 of the invention may be supported in a suitable mounting structure.

As is apparent from FIGS. 20 and 21, the band 31 may be mounted in suitable structures 64 or 66 which are respectively mounted on parts 65 or 67 which can form curbs, road limiting edges, or the like, so that the reflecting element 34 will be visible to travellers on the roads.

What is claimed is:

1. A method of molding a flexible ornamental article, comprising the steps of introducing plastic material into a plurality of rows of mold cavities of ornamental configuration which communicate with each other longitudinally and transversely of said rows exclusively through restricted, filament-forming passages and which include annular eyelet cavities at at least one end of each row to form in one step a network of spaced ornamental elements and integral filaments, forming the only interconnection between said elements, as well as eyelet fasteners at at least one end of each row of ornamental elements, placing stones in all cavities except said eyelet cavities prior to said step of introducing plastic material, so that the plastic material will form in all except said eyelet cavities ornamental settings about said stones, said cavities, including the eyelet cavities, being uniformly spaced from each other at the ends of said rows with the eyelet cavities at one end of each row, and the other end of each row communicating with the exterior of the mold, and further including, before the step of introducing the plastic material, the step of closing said other ends of said rows of cavities with a preformed article positioned with its eyelets in and partially filling mold cavities adjacent to said other ends of said rows, whereby plastic material introduced into said partially filled mold cavities will fuse with said eyelets therein for integrally connecting the preformed article with the molded article to form with the latter an uninterrupted network larger than the mold.

2. In a mold, in combination, a mold body having a plurality of rows of longitudinally and transversely interconnected for respectively receiving stones cavities of ornamental configuration, said cavities being longitudinally and transversely interconnected exclusively by restricted filament-forming passages, and said cavities and passages being adapted to receive plastic material for molding ornamental stone settings in predetermined spaced relationship and for molding at the connections between said cavities interconnecting filaments integral with and interposed between the ornamental stone settings and forming the only connections therebetween, means communicating with said cavities for filling the same with plastic material, said mold body including at one of the ends of said rows annular eyelet cavities respectively communicating with said rows to receive plastic material therefrom, the other ends of said rows each having filament-forming passages communicating with the exterior of the mold and adapted to be closed by filamentary parts of a preformed article identical with that formed in the mold so that an integral molded article of a size larger than the mold itself can be formed.

References Cited by the Examiner

UNITED STATES PATENTS

| | | |
|---|---|---|
| 2,163,814 | 6/1939 | Swarovski. |
| 2,555,754 | 6/1951 | Morin. |
| 2,570,433 | 10/1951 | Dodge. |
| 2,577,350 | 12/1951 | Morin. |
| 3,068,519 | 12/1962 | Morin _____ 264—297 |

ROBERT F. WHITE, *Primary Examiner.*

F. MARLOWE, L. S. SQUIRES, *Assistant Examiners.*